(12) United States Patent
Scholz

(10) Patent No.: US 7,153,382 B2
(45) Date of Patent: Dec. 26, 2006

(54) PRESSURE ELEMENT FOR AN EDGE GLUING MACHINE AND GLUING METHOD

(75) Inventor: Konrad Scholz, Pesterwitz (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 32 days.

(21) Appl. No.: 09/877,372

(22) Filed: Jun. 8, 2001

(65) Prior Publication Data

US 2002/0003023 A1 Jan. 10, 2002

(30) Foreign Application Priority Data

Jun. 9, 2000 (DE) ................................ 100 28 199

(51) Int. Cl.
*B32B 37/10* (2006.01)
(52) U.S. Cl. ...................... 156/212; 156/201; 156/202; 156/216; 156/285
(58) Field of Classification Search ................ 156/212, 156/216, 468, 475, 479, 493, 580, 581, 583.3, 156/556, DIG. 37, DIG. 41, 201–202, 297, 156/299, 285, 286, 476, DIG. 42, 295, 566, 156/DIG. 10–11, DIG. 39, 215, 486, 480–481, 156/488, 227, 465; 100/212, 269.01
See application file for complete search history.

(56) References Cited

U.S. PATENT DOCUMENTS

| | | | | |
|---|---|---|---|---|
| RE23,572 E | * | 11/1952 | Curran et al. ................ | 154/116 |
| 2,970,619 A | * | 2/1961 | Kohler ...................... | 156/380.2 |
| 2,993,523 A | * | 7/1961 | Monaco et al. .............. | 156/381 |
| 3,190,783 A | * | 6/1965 | Tarnok ........................ | 156/489 |
| 3,823,050 A | * | 7/1974 | La Mers ...................... | 156/493 |
| 4,132,583 A | * | 1/1979 | Hodgson ...................... | 156/351 |
| 4,222,812 A | * | 9/1980 | Duewel ........................ | 156/497 |
| 4,261,783 A | * | 4/1981 | Finke ........................ | 156/384 |
| 4,547,252 A | * | 10/1985 | LaMers ...................... | 156/497 |
| 4,658,721 A | * | 4/1987 | Mathis ........................ | 101/9 |
| 4,726,865 A | * | 2/1988 | Treat .......................... | 156/249 |
| 4,997,512 A | * | 3/1991 | Manusch ...................... | 156/486 |
| 5,454,307 A | * | 10/1995 | Chen .......................... | 101/35 |
| 6,376,058 B1 | * | 4/2002 | Schut et al. ................ | 428/220 |
| 6,383,335 B1 | * | 5/2002 | Wu et al. ................ | 156/583.3 |
| 6,529,799 B1 | * | 3/2003 | Paulk et al. ................ | 700/227 |

FOREIGN PATENT DOCUMENTS

| | | |
|---|---|---|
| DE | 37 40 964 | 6/1988 |
| DE | 287 606 | 3/1991 |
| DE | 93 06 484 | 10/1993 |
| DE | 43 15 792 | 11/1994 |
| DE | 196 30 273 | 1/1998 |
| DE | 298 17 408 | 11/1998 |
| DE | 298 19 350 | 1/1999 |
| DE | 298 21 399 | 2/1999 |

(Continued)

*Primary Examiner*—Jessica Rossi
(74) *Attorney, Agent, or Firm*—Stephen D. Harper; Brian J. Hubbard

(57) ABSTRACT

The pressure element (7) is designed for gluing a bandlike covering (4) by means of an adhesive onto a narrow face (3) (edge) of straight or curved (profiled) cross section of a board element (2) or for gluing a film onto a profile bar having a surface of straight or profiled cross section. The pressure element (7) has an elastically deformable pressure face (30). High adhesive bonding strength and high surface quality are achieved in a simple, uncomplicated and cost-effective way by means of only a few pressure elements.

15 Claims, 2 Drawing Sheets

FOREIGN PATENT DOCUMENTS

| | | |
|---|---|---|
| DE | 299 03 734 | 5/1999 |
| DE | 299 16 368 | 9/1999 |
| DE | 199 21 134 | 12/1999 |
| GB | 1050517 | * 12/1966 |
| GB | 2104448 | * 3/1983 |
| WO | WO99/58307 | 5/1999 |

* cited by examiner

PRESSURE ELEMENT FOR AN EDGE GLUING MACHINE AND GLUING METHOD

CROSS REFERENCE TO RELATED APPLICATIONS

This application claims priority under 35 U.S.C. § 119 of German application DE 100 28 199.0 filed Jun. 9, 2000, the entire disclosure of which is hereby incorporated by reference.

FIELD OF THE INVENTION

The invention relates to the gluing of a bandlike covering onto a narrow face (edge) of a board element, in particular of a chipboard, fiberboard or solid wood board, the covering being pressed onto the narrow face by means of at least one pressure element. For adhesive bonding, the covering is normally coated with a hotmelt adhesive. Within the scope of the invention, however, it is also fundamentally possible that the adhesive is first applied to the narrow face, which is called "edge" in the jargon, and the covering is then pressed onto the narrow face. It is known that the pressure elements may be designed as a pressure roller or a sliding shoe. The board elements used are normally coated on their top side and/or underside, but such a coating is not necessary for implementing the method according to the invention and for using the sliding shoe according to the invention. Furniture components and doors may be mentioned as examples of the board elements. The invention also relates correspondingly to the gluing of a film to a profile bar.

Such a gluing or coating of straight and profiled narrow faces of board elements, in particular of wood materials, with coating materials is normally carried out by means of so-called edge gluing machines, past which the board elements run at high speed. The coating materials may consist of plastic (Melamine, PVC, ABS, PP) or be composed on a paper base. In addition to Melamine and polyester, veneers may also be processed as edge material. The coating material, to one side of which a hotmelt adhesive is applied, is pressed firmly onto the narrow faces by suitable pressure devices, to be precise rollers and/or sliding shoes. Projecting edges are then cut off by means of a draw knife or are milled away.

The straight faces are normally coated with the aid of pressure rollers (rubber or steel rollers), the diameter of which may amount to 200 mm, using hotmelt adhesive and edge band. The roller pressure serves for fixing the covering on the workpiece which runs past. The operation may be carried out with one or more rollers arranged one behind the other. Rolling produces an uneven surface. Moreover, the joint obtained by surface pressure is not very leaktight. The factors of waviness and low joint leaktightness are particularly disturbing in the case of bright single-color decorations or glossy surfaces. Long pressure zones with rollers also lead to an uneven surface which can no longer be eliminated later. The hotmelt adhesive cools so quickly that smoothing by means of straight pressure elements is no longer possible.

A method for coating the narrow faces of board elements is known from DE 196 30 273 A1 (Dr. Rudolf Schieber Chemische Fabrik GmbH & Co KG). Here, the pressure face of the pressure element designed as a sliding shoe is curved outward, as seen in a longitudinal direction. Waviness of the glued covering in the longitudinal direction of the narrow face is thereby greatly reduced in a simple and uncomplicated way.

Methods for coating narrow faces of a board element with the aid of sliding shoes have also been known since 1988 from DD 287 606 A7, DE 37 40 964 A1 and DE 43 15 792 A1. One advantage of using sliding shoes, in contrast to pressure rollers, such as are known, for example, from DE 93 06 484 U1, is the markedly lower waviness of the coated narrow faces.

Further problems arising during the production of coated board elements are described below. For clarification, the boundary region between the narrow faces and the main faces (wide faces) of the board elements is designated as the "boundary edge", since the term "edge" is already used in the jargon for the entire narrow face of board elements.

By means of the sliding shoes known, for example, from DE 43 15 792 A1, DD 287 606 A7 and DE 196 30 273 A1, a pressure force is exerted on the entire narrow face, the pressure force being constant over the entire width of the narrow face. Due to pressure being exerted over a large area, relatively high force on the sliding shoe is required in order to achieve the necessary applied pressure at every point on the narrow face.

Further relevant prior art is found in the applicant's applications and utility models, to be precise in DE 199 21 134 A1 (gluing of a bandlike covering), in DE 298 17 408 U1 (pressure elements for the coating of narrow faces), in DE 298 19 350 U1 (device for producing a coated board element), in DE 298 21 399 U1 (sliding shoe for the coating of narrow faces of a board element), in DE 299 03 734 U1 (pressure element and system of pressure elements) and in DE 299 16 368 U1 (arrangement of pressure elements).

The invention therefore relates to a pressure element for an edge gluing machine for gluing a bandlike covering by means of an adhesive, in particular hotmelt adhesive, to a narrow face (edge) of straight or curved (profiled) cross section of a board element, in particular of a chipboard, fiberboard or solid wood board, or for gluing a film onto a profile bar having a surface of straight or profiled cross section.

With all the known pressure elements, it is necessary that the pressure face should correspond to the geometric shape of the narrow face or of the profile bar, in order to achieve sufficient pressure over the entire width of the narrow face or of the profile shape. At least one separate pressure element is therefore necessary for each profile shape. If there is an arrangement of a plurality of pressure elements arranged one behind the other, a correspondingly larger number of pressure elements is required. Another disadvantage of the known pressure elements having a rigid invariable geometry of the pressure face is the need for the narrow face of the board element or the surface of the profile bar to have to maintain a high degree of profile accuracy, so that the bandlike covering or the film is uniformly pressed on and glued on over the entire length of the narrow face or the profile bar, without the untreated profile of the narrow face or of the profile bar being apparent after coating, particularly where thin coating materials are concerned.

The object on which the invention is based, in the pressure element according to the preamble of claim 1, is to avoid the disadvantages mentioned. A high adhesive bonding strength and a high surface quality are to be achieved in a simple, uncomplicated and cost-effective way by means of only a few pressure elements. In the pressure element according to the preamble of claim 1, this object is achieved in that the pressure element has an elastically deformable pressure face.

Figure 1:
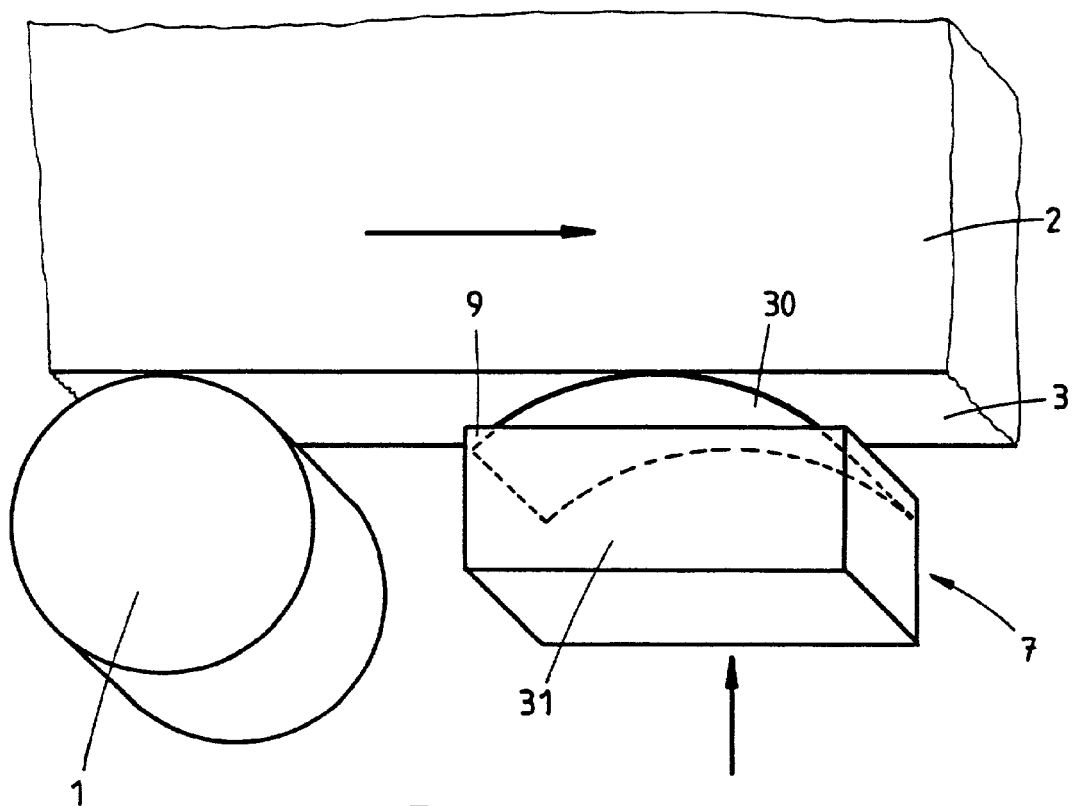
FIG. 1 shows a diagrammatic perspective illustration of the operating mode of a pressure element according to the invention according to a first exemplary embodiment.

In all the drawings, identical reference symbols have the same significance and therefore, where appropriate, are explained only once. The reference symbols are:
1 Pressure roller
2 Board element, chipboard
3 Narrow face
4 Bandlike covering
7 Sliding shoe, pressure element
9 Entry zone
15 Arrow
30 Spring-steel band
31 Basic body

DESCRIPTION OF THE INVENTION

In the case of straight and even in the case of profiled, that is to say curved surfaces, the pressure element according to the invention is matched automatically to this surface and thus makes it possible for a uniform pressure to be exerted, irrespective of the geometric cross-sectional shape of the narrow face or of the profile bar. It was found, surprisingly, that it is not the high pressure of the pressure element, as expected hitherto, but instead the uniformity with which pressure is applied which ensures the high adhesive bonding strength, and consequently the very high surface quality can be achieved.

The invention can be implemented both with regard to sliding shoes and with regard to pressure rollers. It is preferable, however, if the pressure element according to the invention is designed as a sliding shoe.

It is proposed, furthermore, that the deformable pressure face comprise an elastic band, in particular a spring-steel band.

Moreover, it is advantageous, for workpieces having a straight, concave, convex or other profile which are to be coated, if the entry zone of the pressure element is rounded, the elastically deformable pressure face having this rounding. By an "entry zone" is meant, here, that region of the pressure element which is the first to come into contact with the workpiece to be coated.

Preferably, the bandlike covering or the film used in one of the variants according to the invention has a thickness of 0.15 to 0.2 mm. The invention can also be employed particularly effectively when the board element has a thickness of 10 to 40 mm.

All conventional board elements can be processed by means of the arrangement according to the invention. Chipboards, but also other boards, such as joinery boards, plywood boards, so-called MDF boards (medium-density fiberboards) and solid wood boards, may be mentioned as possible board elements.

Nor is the choice of the coverings to be used (edge materials or films) critical. Thus, edge materials consisting of Melamine, Polyester, PVC, ABS and Polypropylene and veneers are suitable. The relatively thin edge materials used to an increased extent nowadays and consisting of decorative papers composed on a paper base and impregnated with colored plastics can also be processed without difficulty.

Nor is the choice of the adhesive to be used in the invention critical. Hotmelt adhesives are preferably used.

For example, hotmelt adhesives may be used which have been produced from polymers and copolymers of synthetic resins, rubbers, polyethylene, polypropylene, polyurethane, acrylic, vinyl acetate, ethylene vinyl acetate and polyvinyl alcohol.

Special examples cover hotmelt adhesives which are produced from the following components:
1) Elastic polymers, such as block copolymers, for example styrene-butadiene, styrene-butadiene-styrene, styreneisoprene-styrene, styrene-ethylene-butylene-styrene, styrene-ethylene-propylene-styrene;
2) Ethylene vinyl acetate polymers, other ethylene esters and copolymers, for example ethylene methacrylate, ethylene-n-butyl acrylate and ethylene acrylic acid;
3) Polyolefins, such as polyethylene and polypropylene;
4) Polyvinylacetate and copolymers thereof;
5) Polyacrylates;
6) Polyamides;
7) Polyesters;
8) Polyvinyl alcohols and copolymers thereof;
9) Polyurethanes;
10) Polystyrenes;
11) Polyepoxides;
12) Copolymers of vinyl monomers and polyalkylene oxide polymers;
13) Aldehydes containing resins, such as phenol aldehyde, urea aldehyde, melamine aldehyde and the like.

Components for increasing adhesion, diluents, stabilizers, antioxidants, dyes and fillers may also be contained.

Examples of components for improving adhesion which may be mentioned are:
1) Natural and modified resins,
2) Polyterpene resins,
3) Phenolically modified hydrocarbon resins,
4) Aliphatic and aromatic hydrocarbon resins,
5) Phthalate esters and
6) Hydrogenated hydrocarbons, hydrogenated resins and hydrogenated resin esters.

Examples of diluents which may be mentioned are liquid polybutene or polypropylene, petroleum waxes such as paraffin and microcrystalline waxes, semiliquid polyethylene, hydrogenated animal, fish and vegetable fats, mineral oil and synthetic waxes and also hydrocarbon oils.

Examples of other additives may be found in the literature.

The invention also relates to a method for gluing a bandlike covering onto a narrow face (edge) of a board element, in particular of a chipboard, fiberboard or solid wood board, or for gluing a film onto a profile bar having a surface of straight or profiled cross section, the covering or film being pressed onto the narrow face or the profile bar by means of at least one pressure element.

The already abovementioned object according to the invention is achieved, here, in that the covering or film is pressed on by means of a pressure element which has an elastically deformable pressure face automatically matched to the shape of a narrow face or of the profile bar.

Exemplary embodiments of the invention are explained in more detail below by reference to the drawings.

The pressure element according to the invention, which is designed as a sliding shoe 7 and for a narrow face 3 of straight cross section, is illustrated in FIG. 1 during the operating mode. A board element 2 with a straight narrow face 3 runs from left to right first past a pressure roller 1 and then past the sliding shoe 7. A spring-steel band 30, which forms part of the sliding shoe 7, is pressed onto the narrow face 3 or onto the bandlike covering, not illustrated for the sake of clarity. The spring-steel band 30 is fastened, preferably screwed, to the basic body 31 of the sliding shoe 7 only in the region of the entry zone 9. The rounding of the entry zone 9 is not illustrated for the sake of clarity.

Figure 2:
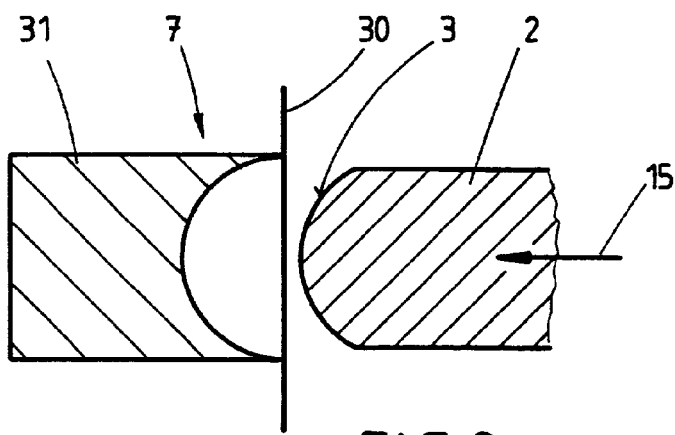
FIG. 2 shows a diagrammatic illustration of a cross section through a second pressure element according to the invention before the commencement of the gluing method.
Figure 3:
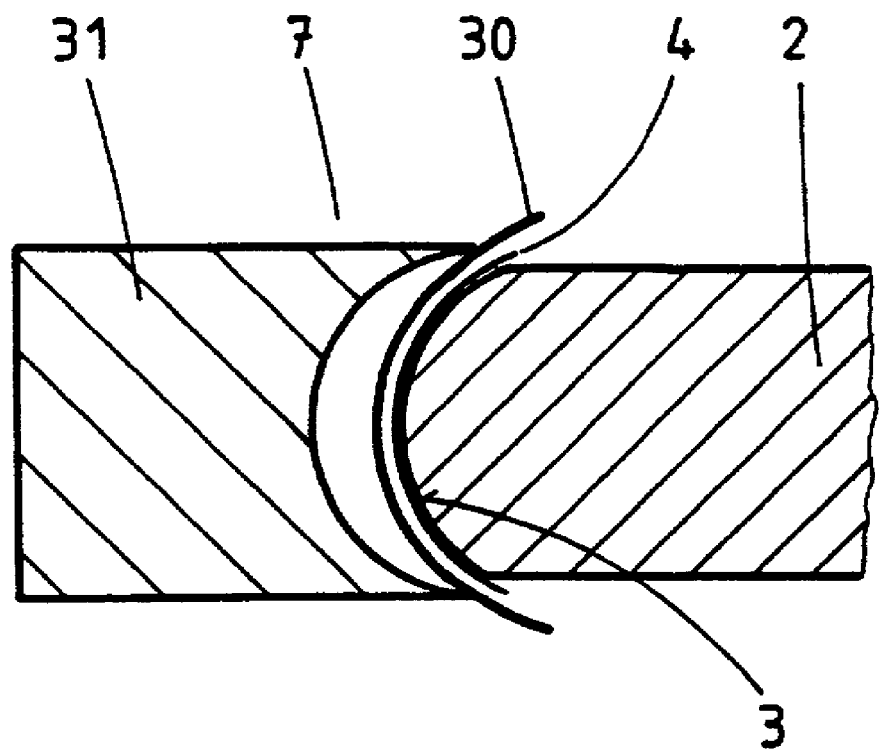
FIG. 3 shows an illustration of the pressure element according to FIG. 2 during the gluing method.

The pressure element according to the invention or the method according to the invention, when applied to a narrow face of profiled cross section of a board element, is illustrated diagrammatically in FIGS. 2 and 3. FIG. 2 shows the state of rest of the spring-steel band 30 which is in a straight orientation. At the commencement of the gluing method, the board element 2 moves in the direction of the arrow 15, so that the spring-steel band 30 is pressed in and comes to bear uniformly on the narrow face 3 (FIG. 3). FIG. 3 additionally depicts the bandlike covering 4 which is glued on by means of the method according to the invention or by means of the pressure element according to the invention.

What is claimed:

1. A method of adhering a covering to an edge of a workpiece, comprising:
    providing a sliding shoe having a spring steel band;
    placing the covering between the spring steel band and the workpiece edge;
    pressing the covering onto the workpiece edge by slidably engaging the covering with the spring steel band along the longitudinal axis of the workpiece, wherein only one edge of the spring steel band is attached to the sliding shoe.

2. The method of claim 1, further comprising engaging the covering with a roller.

3. The method of claim 1, further comprising engaging the covering with a roller before engaging the covering with the sliding shoe.

4. The method of claim 1, wherein the spring steel band has a length which is substantially shorter than the length of the workpiece edge.

5. The method of claim 1, wherein the workpiece is a profile bar.

6. The method of claim 1, wherein the covering comprises melamine, polyester, PVC, ABS, polypropylene, veneer, or a paper base impregnated with colored plastics.

7. The method of claim 1, wherein the covering comprises a film.

8. The method of claim 1, wherein the covering has a thickness of 0.15 to 0.2 mm.

9. The method of claim 1, further comprising applying an adhesive to the covering.

10. The method of claim 1, further comprising applying a hot melt adhesive to the covering.

11. The method of claim 10, wherein the hot melt adhesive is produced from polymers and copolymers of synthetic resins, rubbers, polyethylene, polypropylene, polyurethane, acrylic, vinyl acetate, ethylene vinyl acetate and polyvinyl alcohol.

12. The method of claim 1, wherein the workpiece is a board element.

13. The method of claim 12, wherein the board element is a chipboard, joinery board, plywood board, medium-density fiberboard, or solid wood board.

14. The method of claim 12, wherein the board element has a thickness of 10 to 40 mm.

15. A method of adhering a covering to an edge of a workpiece, comprising:
    providing a roller;
    providing a sliding shoe having a spring steel band;
    placing the covering between the roller and the workpiece edge;
    engaging the covering with the roller along the longitudinal axis of the workpiece, such that the covering slidably engages the spring steel band; and
    pressing the covering onto the workpiece edge by slidably engaging the covering with the spring steel band along the longitudinal axis of the workpiece, wherein only one edge of the spring steel band is attached to the sliding shoe.

* * * * *